United States Patent
Sato et al.

(10) Patent No.: US 9,097,561 B2
(45) Date of Patent: Aug. 4, 2015

(54) POSITION TRANSDUCER

(71) Applicants: CITIZEN CHIBA PRECISION CO., LTD., Chiba (JP); CITIZEN HOLDINGS CO., LTD., Tokyo (JP)

(72) Inventors: Hideaki Sato, Chiba (JP); Kazunari Ogata, Chiba (JP); Naoki Ohta, Chiba (JP); Asuka Moritaku, Chiba (JP); Tomonori Takeda, Chiba (JP)

(73) Assignees: CITIZEN CHIBA PRECISION CO., LTD., Chiba (JP); CITIZEN HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/389,741

(22) PCT Filed: Oct. 25, 2013

(86) PCT No.: PCT/JP2013/078974
§ 371 (c)(1),
(2) Date: Feb. 13, 2015

(87) PCT Pub. No.: WO2014/065404
PCT Pub. Date: May 1, 2014

(65) Prior Publication Data
US 2015/0153204 A1 Jun. 4, 2015

(30) Foreign Application Priority Data

Oct. 26, 2012 (JP) ................. 2012-236661
Mar. 28, 2013 (JP) ................. 2013-070399

(51) Int. Cl.
*G01D 5/347* (2006.01)
*G01D 5/30* (2006.01)
*G01D 3/036* (2006.01)

(52) U.S. Cl.
CPC .............. *G01D 5/3473* (2013.01); *G01D 3/036* (2013.01); *G01D 5/30* (2013.01)

(58) Field of Classification Search
CPC combination set(s) only.
See application file for complete search history.

(56) References Cited

U.S. PATENT DOCUMENTS

| 5,844,673 | A | 12/1998 | Ivers |
| 7,820,956 | B2 * | 10/2010 | Sidor et al. ............... 250/231.13 |

(Continued)

FOREIGN PATENT DOCUMENTS

| GB | 2264781 A | 9/1993 |
| JP | S64-37619 U | 3/1989 |

(Continued)

OTHER PUBLICATIONS

International Search Report for PCT/JP2013/078974, Dec. 3, 2013.

(Continued)

*Primary Examiner* — Francis M Legasse, Jr.

(57) ABSTRACT

Provided is a position transducer which can be manufactured at low cost, improve the signal-to-noise ratio of an output obtained from a detector, and obtain a stable output even if the temperature changes. A position transducer 100 includes a butterfly-shaped reflector 7 attached to a rotating shaft 2 of a rotation restriction motor 1, an LED die 4 disposed to face a central portion of the reflection surface of the reflector 7, a diffused-light absorbing member disposed on the surfaces of a diffused light absorber 3 and a case 5, installed on the fixed side of the motor 1 so as to surround the reflector 7 with a distance from the reflector 7 at the rear of the reflector 7 as viewed from the LED die 4 and absorbing illumination light from the LED die 4 which has not illuminated the reflection surface, and detectors 11 mounted on the same printed circuit board 6 as the LED die 4 to detect an image reflected by the reflector 7.

8 Claims, 13 Drawing Sheets

(56) References Cited

U.S. PATENT DOCUMENTS

2004/0206894 A1    10/2004    Oka et al.
2005/0116153 A1    6/2005    Hataguchi et al.
2007/0195417 A1    8/2007    Yamamoto et al.

FOREIGN PATENT DOCUMENTS

| | | |
|---|---|---|
| JP | 2001-4647 A | 1/2001 |
| JP | 2002-512364 A | 4/2002 |
| JP | 2004-340929 A | 12/2004 |
| JP | 2005-164588 A | 6/2005 |
| JP | 2007-528021 A | 10/2007 |
| JP | 2009-542178 A | 11/2009 |
| WO | 99/54688 A1 | 10/1999 |
| WO | 2005/088355 A1 | 9/2005 |
| WO | 2008/054879 A1 | 5/2008 |

OTHER PUBLICATIONS

Japan Patent Office, Office Action for Japanese Patent Application No. 2013-070399, Apr. 15, 2014.

* cited by examiner (a) ▨ Sa > ▨ Sb (b) ▨ Sa = ▨ Sb (c) ▨ Sa < ▨ Sb (a)

(b)

POSITION TRANSDUCER

TECHNICAL FIELD

The present invention relates to a position transducer to be mounted on a rotation restriction motor configured to drive optical parts, such as a mirror, for scanning laser light.

BACKGROUND ART

Patent Literature 1 discloses a configuration of a conventional reflection-type optical position transducer system. FIG. 13A to FIG. 13E are diagrams for explaining the reflection-type optical position transducer system. FIG. 13A to FIG. 13E respectively show an illustrative schematic isometric view of the position transducer system, an illustrative schematic isometric bottom view of a reflector element in the position transducer system, an illustrative schematic plan view of a light source and a detector circuit of the position transducer system, an illustrative schematic bottom view of the reflector element, and an illustrative schematic side section view of a rotation restriction motor system.

The conventional reflection-type optical position transducer includes a single LED light source 26, a reflector 12 attached to a rotating shaft of a rotation restriction motor and alternately having regions providing specular reflection and regions providing illumination absorption, and a detector 14 that receives reflected illumination light from the reflector. The reflector 12 is attached to the upper end part of a rotator shaft 30 that rotates within a housing 32. On the surface of the reflector 12 facing the detector 14, three specular reflection regions 16 and three illumination absorption regions 18 are formed and disposed alternately. In the detector 14, the single LED light source 26 is disposed at the center, a light shielding unit 28, such as an O-ring, is attached on the periphery thereof, and further three pairs of detector regions 20a and 20b, 22a and 22b, and 24a and 24b are provided on the periphery of the light shielding unit 28. Light emitted from the single LED light source 26 is reflected by the specular reflection regions 16, and received by the detector regions 20a and 20b, 22a and 22b, and 24a and 24b. The received light output is processed in a processing circuit.

Patent Literature discloses a structure of an optical system of an optical rotary encoder. The encoder includes a light source, a rotary scale, a reflector, and a light-receiving element. The light source is provided in the vicinity on the rotation center line of a rotating shaft. The rotary scale is attached to the rotating shaft so as to be capable of rotating about the rotation center line, and has an optical pattern including light-transmitting parts and light shielding parts formed alternately in the circumferential direction. The reflector is disposed with an interval from the rotary scale, and reflects light from the light source so that the light forms a parallel light flux whose width almost does not change within the section including the rotation center line, and thereby, the parallel light flux illuminates the light-transmitting parts of the rotary scale and the light having passed through the light-transmitting parts travels toward the periphery of the light source. The light-receiving element receives the light having passed through the light-transmitting parts. The optical rotary encoder according to Patent Literature 2 is a transducer that detects bright and dark light from the reflector by a detector, encodes the light in a circuit in the subsequent stage, and thereby obtains position information.

Patent Literature 3 relates to an encoder as in Patent Literature 2, and discloses an optical system that utilizes a reflective cylindrical surface. In this encoder, a module including a photo-detector and a light source is disposed to face a drum. On the surface in the circumferential direction of the drum, stripe-shaped non-reflection regions are provided at regular intervals. The drum is illuminated with light of the light source, and the light reflected thereby is detected by the photo-detector. Patent Literature 3 discloses an optical system and a detection method unique to an encoder that illuminates non-reflection regions disposed in the form of a stripe on the surface of the drum and the reflection regions therebetween with light, and that detects the rotation position of the non-reflection regions by reflected light.

Patent Literature 4 discloses a structure of a rotary motor for detecting a rotation position. In this rotary motor, in order to detect the rotation position thereof, a butterfly-shaped diffusion surface having an angle width of 90 degrees is attached to a rotor shaft. The diffusion surface has an opaque surface in the shape of a disc in the vicinity of the central part (see Patent Literature 4, FIG. 1B). A lens is disposed to face the diffusion surface, and behind the lens, a stationary detector is installed. As a light source, four LEDs are disposed on both sides of the lens. Light emitted from the four LEDs is reflected by the rotating diffusion surface, and the reflected light is concentrated by the lens and received by the stationary detector. In the rotary motor in Patent Literature 4, the LEDs and the detector are disposed not on the same plane but in different spaces, and from each of the four LED light sources, light is illuminated toward each of the reflection surfaces.

PRIOR ART DOCUMENT

Patent Literature

Patent Literature 1 Japanese Unexamined Patent Application Publication No. 2009-542178
Patent Literature 2 Japanese Unexamined Patent Publication No. 2004-340929
Patent Literature 3 Japanese Unexamined Patent Publication No. 2005-164588
Patent Literature 4 UK Patent Application Publication No. 2264781

SUMMARY OF INVENTION

If a reflection region and a non-reflection region exist on the same plane of a reflector and the optical distance from an LED light source to the reflector and the optical distance from the reflector to a detector are the same, a contrast difference of an image projected onto the detector becomes unlikely to appear, and therefore, the noise characteristics of a signal output from the detector are degraded. The noise characteristics refer to a ratio of a signal by light from the reflection region to a noise signal by light from the non-reflection region (S/N ratio), and in the following, this is also referred to as a "contrast ratio".

If the contrast ratio is reduced, it is necessary to increase the amount of light by increasing a current flowing through the LED light source so that a sufficient signal is output from the detector. If doing so, the junction temperature of the LED light source rises and the temperature of the LED light source will change. Further, if the reflection region and the non-reflection region are provided alternately on the same plane, light is absorbed and therefore, the temperature of the surface of the reflector becomes more likely to rise than that in the peripheral environment. The absorption rate of the non-reflection region changes depending on the illumination wavelength, and also depending on temperature. As a result, the peak wavelength of the LED light source changes depending on temperature and the absorption rate of the non-reflection region changes depending on temperature, and therefore, the temperature characteristics of the position transducer are degraded.

Further, in order to provide a contrast by the reflector in which the reflection region and the non-reflection region are provided on the same plane, it is necessary to take great care of the surface roughness state of the non-reflection region and in selection of the non-reflection coating agent, and therefore, there is a limit to manufacture and an expensive reflector will result.

In light of the above circumstances, an object of the present invention is to provide a position transducer which can be manufactured at low cost, improve the signal-to-noise ratio of an output obtained from a detector, and obtain a stable output even if the temperature changes.

A position transducer according to the present invention includes a reflector attached to a rotating shaft of a rotation restriction motor, a diffused light source disposed so as to face a central portion of a reflection surface of the reflector, a diffused-light absorbing member installed on a fixed side of the rotation restriction motor so as to surround the reflector with a distance from the reflector at the rear of the reflector as viewed from the diffused light source, the diffused-light absorbing member absorbing illumination light from the diffused light source which has not illuminated the reflection surface, and a plurality of detectors mounted on the same printed circuit board as the diffused light source to detect an image reflected by the reflector.

Preferably, in the position transducer according to the present invention, the diffused-light absorbing member has a fine structure provided by surface treatment and absorbs the illumination light by repeatedly reflecting the illumination light within the fine structure.

Preferably, in the position transducer according to the present invention, as the reflection surface, the reflector has a plurality of reflection surfaces protruding radially from the rotating shaft on the same plane.

Preferably, in the position transducer according to the present invention, the diffused light source is LEDs in the same number as that of the reflection surfaces.

Preferably, in the position transducer according to the present invention, the reflector has a reflection surface in the shape of a butterfly as the reflection surface.

Preferably, in the position transducer according to the present invention, the plurality of detectors is two sets of photodiodes, each set including photodiodes in the number corresponding to that of the reflection surfaces, and the two sets of photodiodes are disposed side by side so as to alternately surround the rotating shaft.

Preferably, in the position transducer according to the present invention, a metal coating is applied to the reflection surface of the reflector.

Preferably, in the position transducer according to the present invention, the plurality of detectors each outputs a signal that continuously increases or decreases in accordance with a continuous increase or decrease in a light receiving region in each detector when the position of an image by the reflector moves due to rotation, and the position transducer further includes a signal processing circuit connected to each of the plurality of detectors, the signal processing circuit outputting a voltage value corresponding to an increase or decrease in the light receiving region.

According to the present invention, it is possible to provide a position transducer which can be manufactured at low cost, improve the signal-to-noise ratio of an output obtained from a detector, and obtain a stable output even if the temperature changes.

DESCRIPTION OF EMBODIMENTS

Hereinafter, with reference to the drawings, a position transducer according to the present invention will be explained in detail. However, it should be noted that the technical scope of the present invention is not limited to embodiments thereof and includes the invention described in claims and equivalents thereof.

Figure 1A:
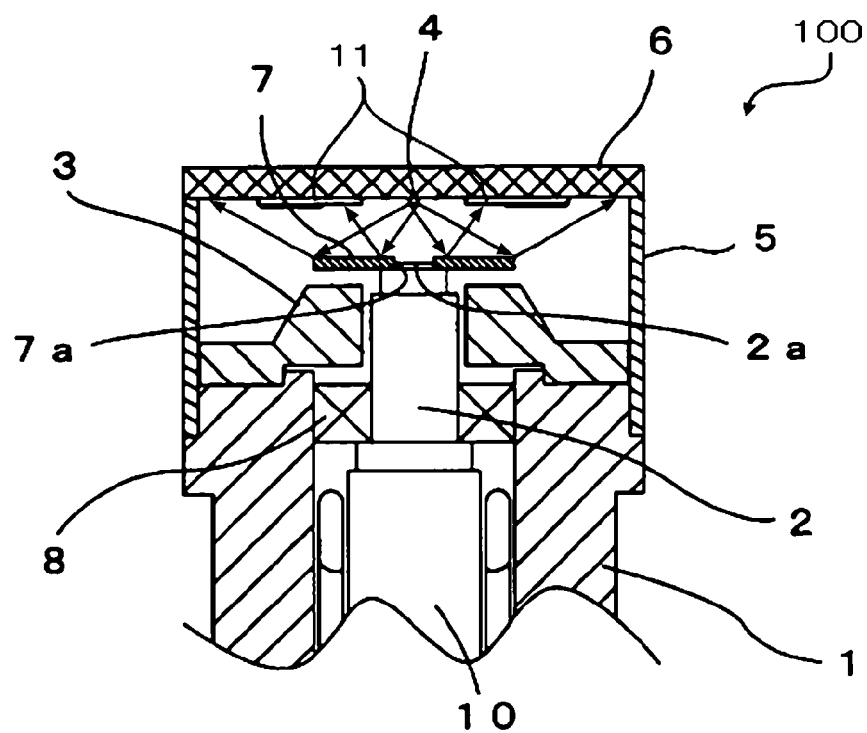
FIG. 1A is a longitudinal section view of a position transducer 100.
Figure 1B:
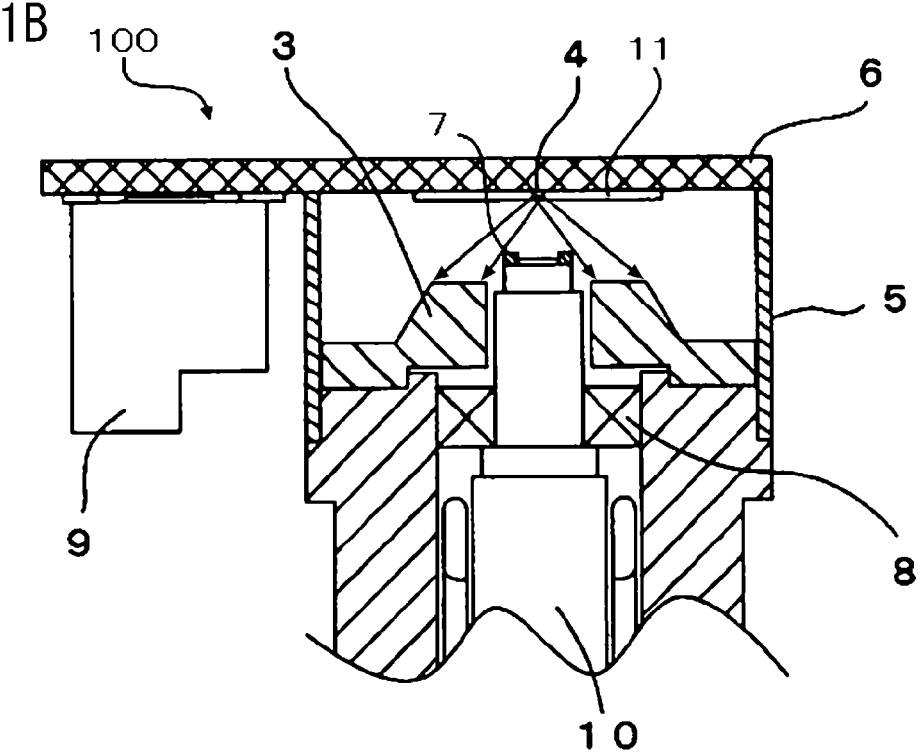
FIG. 1B is a longitudinal section view of the position transducer 100 when viewed from a lateral direction 90 degrees rotated from the viewing direction in FIG. 1A.
Figure 1C:
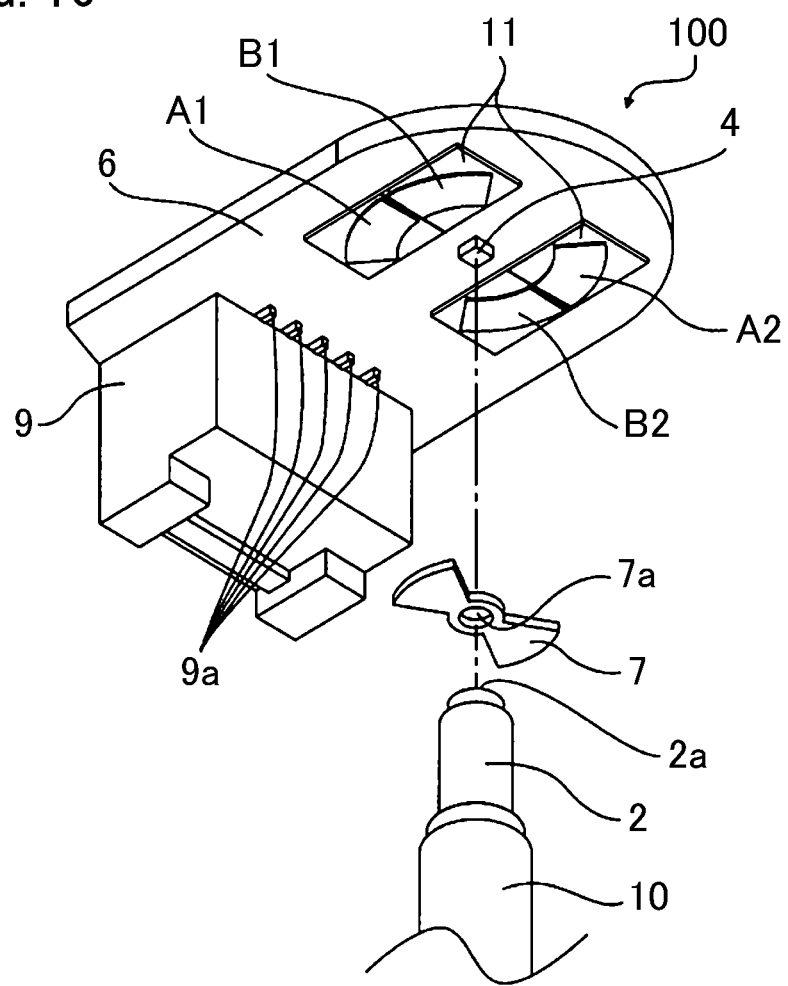
FIG. 1C is an exploded perspective view of the position transducer 100.
Figure 1D:
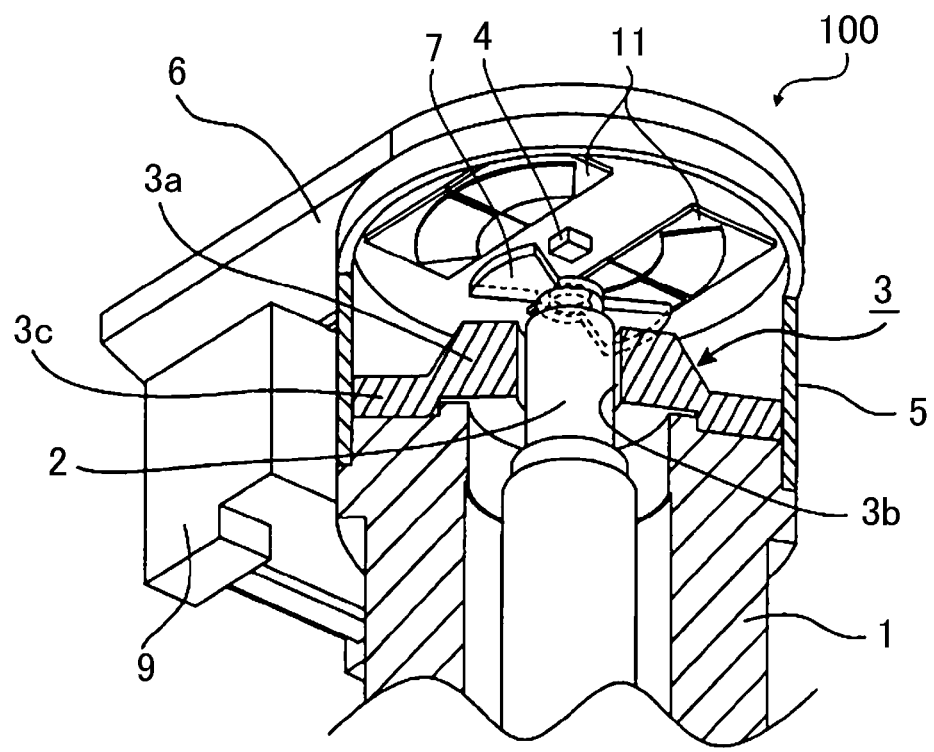
FIG. 1D is a perspective view illustrating the state where the position transducer 100 is in the assembling process, with part of which being cut away.

FIG. 1A is a longitudinal section view of a position transducer 100. FIG. 1B is a longitudinal section view of the position transducer 100 when viewed from a lateral direction 90 degrees rotated from the viewing direction in FIG. 1A. FIG. 1C is an exploded perspective view of the position transducer 100. FIG. 1D is a perspective view illustrating the state where the position transducer 100 is in the assembling process, with part of which being cut away.

The position transducer 100 includes a rotation restriction motor 1, a diffused light absorber 3, an LED die 4, a case 5, a printed circuit board 6, a butterfly-shaped reflector 7, a detector 11, etc. The position transducer 100 is a reflection-type optical position transducer that detects a rotation angle of the rotation restriction motor 1 by detecting, with the detector 11, light emitted from the LED die 4 and reflected by the butterfly-shaped reflector 7.

The rotation restriction motor 1 has a rotating shaft 2 at the end part of a rotor 10, and the rotating shaft 2 is supported by a bearing 8. At the tip end part of the rotating shaft 2, a reflector attachment part 2a protrudes. To the reflector attachment part 2a, the butterfly-shaped reflector 7 is attached. By the drive of the rotation restriction motor 1, the butterfly-shaped reflector 7 rotates together with the rotating shaft 2.

On the top part of the rotation restriction motor 1, the diffused light absorber 3 is disposed with a distance from the butterfly-shaped reflector 7. As illustrated in FIG. 1D, the diffused light absorber 3 has a disc-shaped part 3c, a trapezoid-shaped part 3a formed in the vicinity of the center of the disc-shaped part 3c, and a through-hole 3b formed in the center of the trapezoid-shaped part 3a. The diffused light absorber 3 is attached to the top end of the rotation restriction motor 1 so that the rotating shaft 2 is inserted into the through-hole 3b. The diffused light absorber 3 is incorporated in the cylindrical case 5.

The diffused light absorber 3 and the case 5 are the members on the fixed side that do not rotate by the rotation restriction motor 1. On the surfaces of the diffused light absorber 3 and the case 5 on the fixed side with a distance from the reflection surfaces of the butterfly-shaped reflector 7, a diffused-light absorbing member 3d (see FIG. 2) that absorbs light from the LED die 4 is disposed. In other words, the internal space formed by the diffused light absorber 3 and the case 5 is surrounded by the diffused-light absorbing member 3d.

The diffused light absorber 3 and the case 5 absorb light emitted from the LED die 4 and which has not illuminated the butterfly-shaped reflector 7 with the diffused-light absorbing member 3d.

Figure 2:
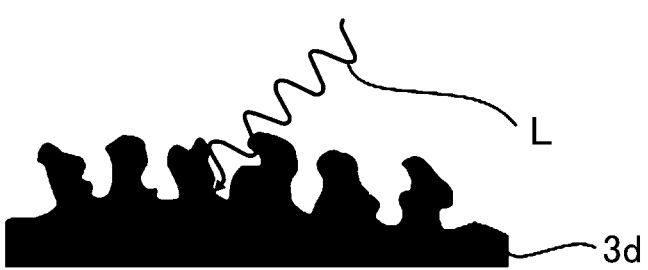
FIG. 2 is an enlarged view of the surface of the diffused-light absorbing member 3d.

FIG. 2 is an enlarged view of the surface of the diffused-light absorbing member 3d. The diffused-light absorbing member 3d is a black member having been subjected to surface treatment, and has a three-dimensional, complicated fine structure with bumps and dips having a pitch and a height corresponding to wavelengths of light. The diffused-light absorbing member 3d confines and absorbs light L incident on the surface thereof by repeatedly reflecting the light by the fine structure (stray light effect). The surface treatment is performed by a method, such as vapor deposition, plating, inorganic baking finish, and electrostatic flocking.

Regarding case 5, the printed circuit board 6 is attached so as to cover the case 5. The LED die 4 is mounted at the position corresponding to the center of the rotating shaft 2 on the undersurface of the printed circuit board 6 as illustrated in FIG. 1A. The LED die 4 is disposed on the printed circuit board 6 so as to face the butterfly-shaped reflector 7. The LED die 4 is a diffused light source that emits light from one point in such a manner that the emitted light is radiated with a predetermined spread. In FIG. 1A and FIG. 1B, light illuminated from the LED die 4 is indicated by arrows. In the position transducer 100, as the LED die 4, for example, aluminum gallium arsenic (AlGaAs) whose peak wavelength is 870 nm is used.

To the printed circuit board 6, a connector 9 having a ten-pin terminal is attached. Each pin of the connector 9 is electrically connected to each land of a pattern (not illustrated) formed on the printed circuit board 6 by soldering, etc. In FIG. 1C, five pins 9a are seen, but the remaining pins are not seen because of being disposed on the backside of the connector. Each pin is connected to a pattern leading to terminals of the detector 11 and the LED die 4. To the connector 9, a female (or male) connector (not illustrated), to which a connection terminal of a signal processing circuit, etc., is connected, is electrically coupled.

Figure 3:
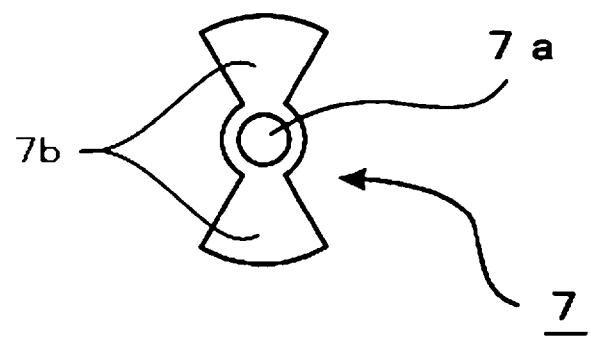
FIG. 3 is a top view of the butterfly-shaped reflector 7.
Figure 13:
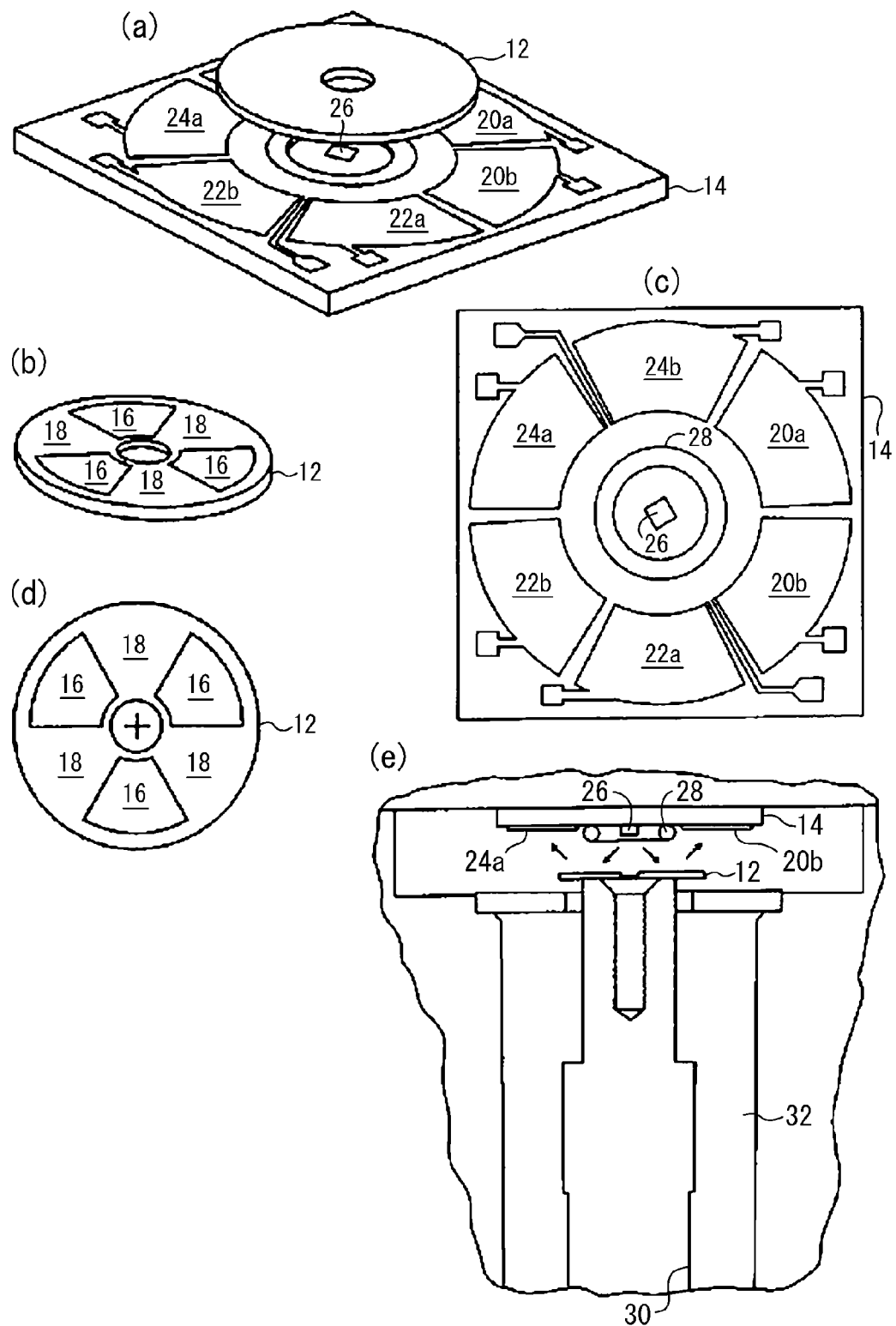
FIG. 13 is a diagram for explaining a conventional optical position transducer using reflected illumination.

FIG. 3 is a top view of the butterfly-shaped reflector 7. The butterfly-shaped reflector 7 has an attachment hole 7a for attachment to the reflector attachment part 2a of the rotating shaft 2 by fitting, and has flat reflection surfaces 7b in the shape of a butterfly protruding from the center. The butterfly-shaped reflector 7 has the reflection surfaces 7b, which are a reflection region, but does not have a non-reflection region, unlike the reflector 12 in FIG. 13B. Light emitted from the LED die 4 and which has illuminated a reflection surface 7b of the butterfly-shaped reflector 7 is reflected by the reflection surface 7b toward the detector 11. On the other hand, part of the light emitted from the LED die 4, which has passed through the region other than the reflection surfaces 7b and reached to the backside of the butterfly-shaped reflector 7, is absorbed by the diffused-light absorbing member 3d.

The butterfly-shaped reflector 7 is fabricated by machining a metal plate machined by a mirror finish, such as cold rolling, into the shape of a butterfly by etching or wirecut. Further, it may also be possible to improve the reflectance of the butterfly-shaped reflector 7 by applying a metal coating to the reflection surfaces 7b by vapor deposition of aluminum, silver, or gold.

Figure 4:
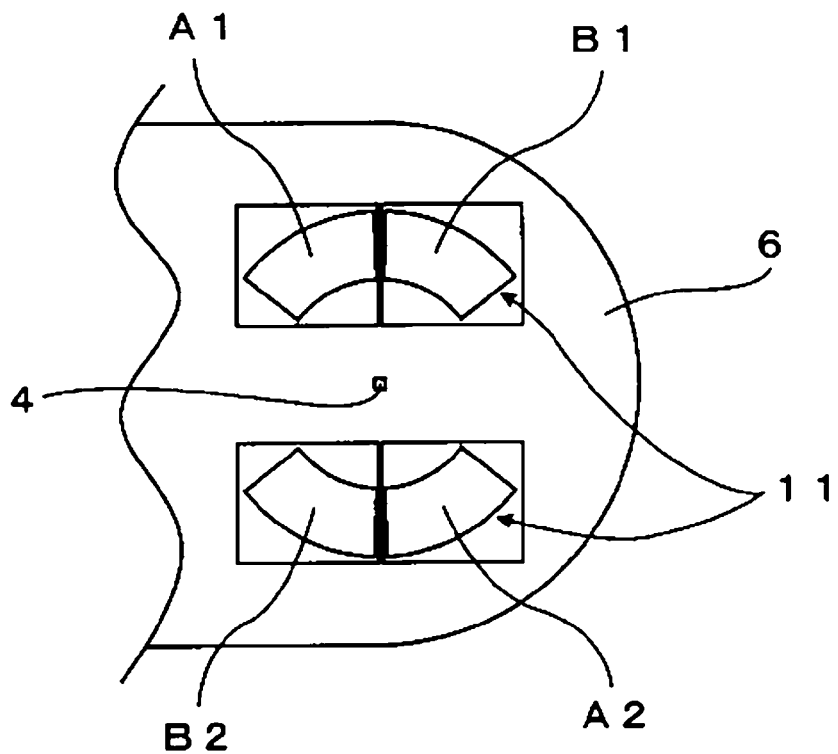
FIG. 4 is a diagram illustrating a disposition of the detector 11 on the printed circuit board 6.

FIG. 4 is a diagram illustrating a disposition of the detector 11 on the printed circuit board 6. The detector 11 includes four photodiodes A1, A2, B1, and B2, and these photodiodes are disposed around the LED die 4 on the undersurface of the printed circuit board 6. Each photodiode is configured by a silicon wafer having a sensitive wavelength of 800 to 900 nm. The LED die 4 and the photodiodes A1, A2, B1, and B2 are mounted directly on the printed circuit board 6 without being packaged (chip on board).

The respective photodiodes are mounted so that the photodiodes A1 and A2 face each other with the LED die 4 disposed at the center point of the printed circuit board 6 being sandwiched in between, and that the photodiodes B1 and B2 face each other in the same manner. The photodiodes A1 and B1 are attached so as to be close to each other and so the photodiodes B2 and A2. The photodiodes A1 and A2 of the four photodiodes A1 and B1, B2 and A2 are connected in parallel to form a pair, and the photodiodes B1 and B2 are connected in parallel to form another pair.

An image in the shape of a butterfly emitted from the LED die 4 and reflected by the butterfly-shaped reflector 7 moves accompanying the rotation of the rotation restriction motor 1. The two pairs of photodiodes receive the image, and output a photoelectric current corresponding to the area of the light receiving region. Photoelectric currents Ia and Ib output from the two pairs of photodiodes are subjected to current-voltage conversion by a signal processing circuit 13, to be explained next, into Va and Vb, respectively. A voltage difference Va−Vb is an output of the position transducer 100.

Figure 5:
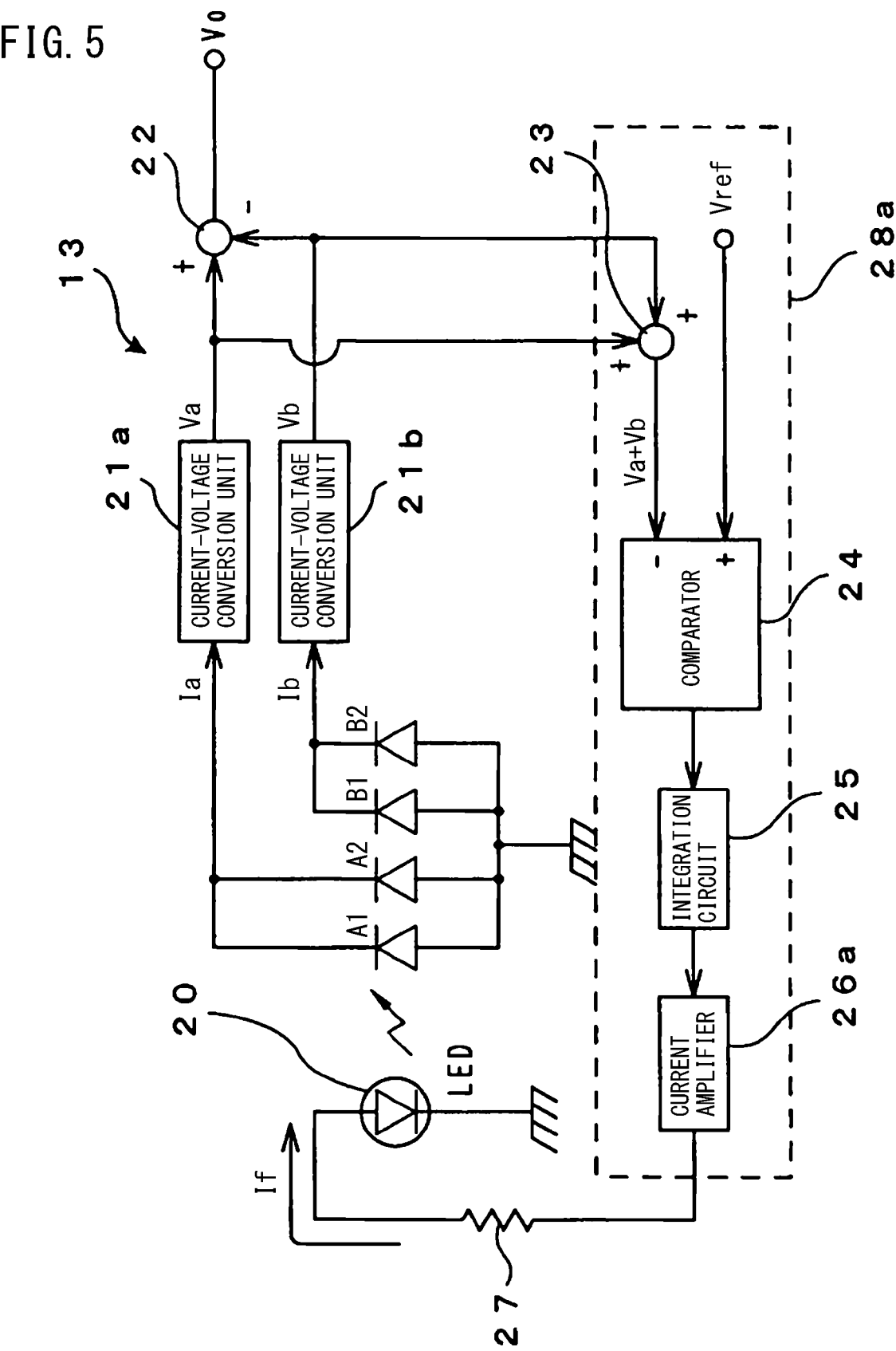
FIG. 5 is a circuit diagram of the signal processing circuit 13 of the position transducer 100.

FIG. 5 is a circuit diagram of the signal processing circuit 13 of the position transducer 100. Although not illustrated in FIG. 1A to FIG. 1D, the position transducer 100 has the signal processing circuit 13 that converts the photoelectric currents by the photodiodes A1, A2, B1, and B2 corresponding to the rotation angle of the rotation restriction motor 1 into voltage signals. In order to obtain a position transducer output with a high accuracy, the signal processing circuit 13 has an AGC circuit 28a that performs temperature compensation and linear compensation for the temperature change that cannot be compensated for by the optical system.

The current Ia, which is the output of the photodiodes A1 and A2, is input to a current-voltage conversion unit 21a.

Further, the current Ib, which is the output of the photodiodes B1 and B2, is input to a current-voltage conversion unit 21b. The output voltage Va of the current-voltage conversion unit 21a and the output voltage Vb of the current-voltage conversion unit 21b are input to a subtractor 22, and subjected to subtraction processing.

Further, the output voltage Va of the current-voltage conversion unit 21a and the output voltage Vb of the current-voltage conversion unit 21b are guided to the AGC circuit 28a and added in an adder 23. The addition output is compared with a reference voltage Vref by a comparator 24. The output of the comparator 24 is subjected to integration processing in an integration circuit 25, and amplified by a current amplifier 26a. Due to this, via a resistor 27, a current If is supplied to an LED 20. A position transducer output Vo processed in the signal processing circuit 13 will be as follows.

$$Vo=(Ia-Ib)Vref/(Ia+Ib) \quad (1)$$

Figure 6:
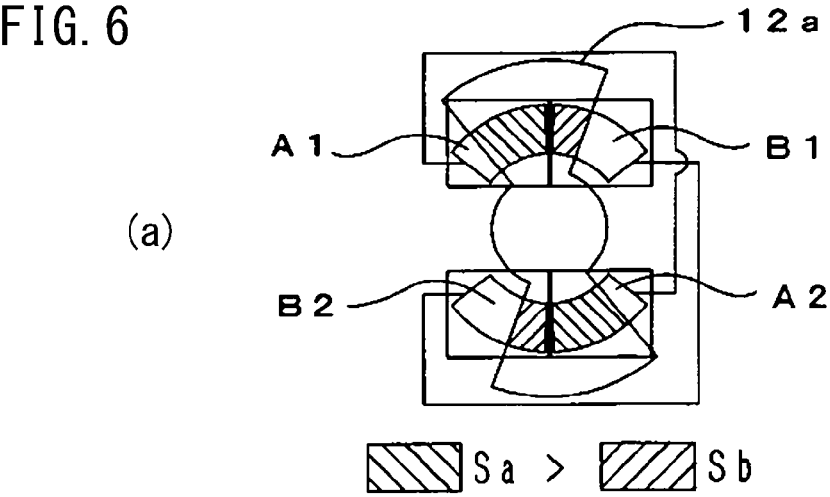
FIG. 6 is a diagram illustrating positional relationships between the photodiodes A1, A2, B1, and B2 and images 12a, 12b, and 12c in the shape of a butterfly.
Figure 6:
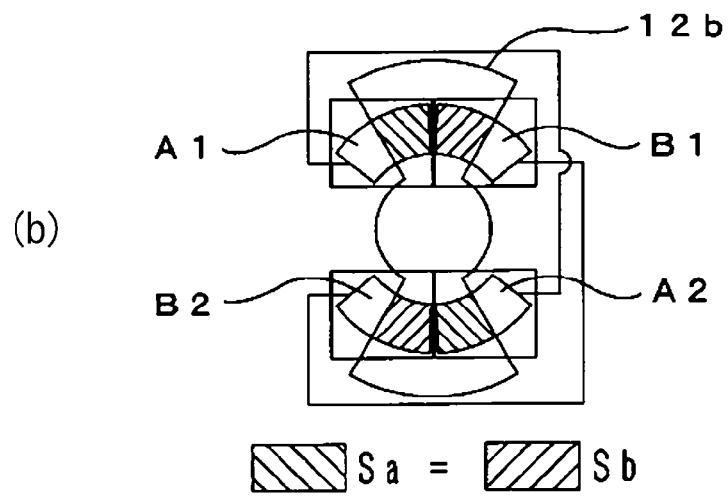
Figure 6:
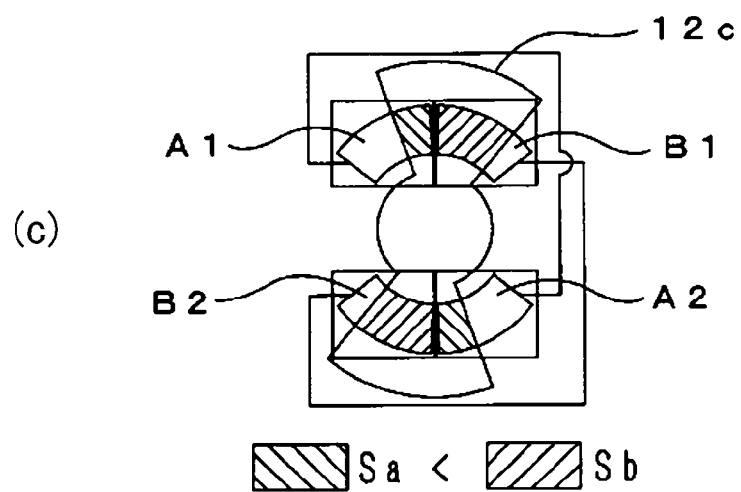

FIG. 6A to FIG. 6C are diagrams illustrating positional relationships between the photodiodes A1, A2, B1, and B2 and images 12a, 12b, and 12c in the shape of a butterfly. The image illuminated to the photodiodes A1, A2, B1, and B2 from the butterfly-shaped reflector 7 moves in accordance with the rotation angle of the rotation restriction motor 1 as the images 12a, 12b, and 12c in FIG. 6A to FIG. 6C.

In the following, the area of the light receiving region of the photodiodes A1 and A2 is denoted by Sa, and the light receiving region of the photodiodes A1 and A2 is referred to as an "Sa region". Similarly, the area of the light receiving region of the photodiodes B1 and B2 is denoted by Sb, and the light receiving region of the photodiodes B1 and B2 is referred to as an "Sb region". FIG. 6A to FIG. 6C illustrate the case where the Sa region is larger than the Sb region, the case where the Sa region and the Sb region are of the same size, and the case where the Sa region is smaller than the Sb region, respectively.

For example, assume that the rotation angles corresponding to the butterfly-shaped images 12a, 12b, and 12c are positive, zero, and negative, respectively. Then, in the case in FIG. 6A, the area difference is Sa−Sb>0, and therefore, the output voltage of the position transducer 100 is Va−Vb>0 corresponding to the positive rotation angle. In the case in FIG. 6B, the area difference is Sa−Sb=0, and therefore, the output voltage of the position transducer 100 is Va−Vb=0 corresponding to the zero rotation angle. In the case in FIG. 6C, the area difference is Sa−Sb<0, and therefore, the output voltage of the position transducer 100 is Va−Vb<0 corresponding to the negative rotation angle.

Figure 7:
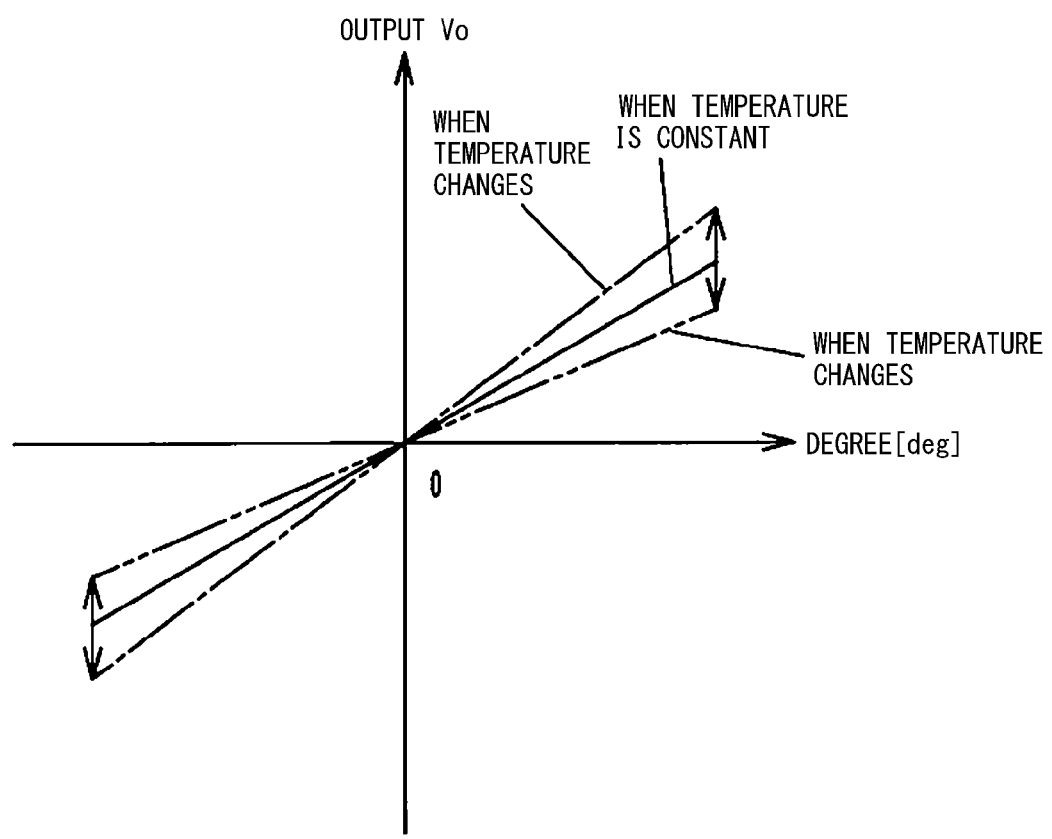
FIG. 7 is a graph indicating a relationship between the position transducer output Vo and the rotation angle.

FIG. 7 is a graph indicating a relationship between the position transducer output Vo and the rotation angle. As illustrated in FIG. 7, the position transducer output increases in proportion to the rotation angle.

In general, if it is assumed that the conversion factor of the photoelectric current for illumination from the reflector is Kr, the light receiving areas of light from the reflector are Sa and Sb, the reflectance of the reflector is $\alpha$, the conversion factor of the photoelectric current for illumination from the diffused light absorber is Ke, the total area of the photodiodes is S, the light receiving areas of reflection from the diffused light absorber are S−Sa and S−Sb, and the reflectance of the diffused light absorber is $\beta$, then the photoelectric currents Ia and Ib of the photodiodes are as follows.

$$Ia=Kr \cdot Sa \cdot \alpha + Ke \cdot (S-Sa) \cdot \beta \quad (2)$$

$$Ib=Kr \cdot Sb \cdot \alpha + Ke \cdot (S-Sb) \cdot \beta \quad (3)$$

By substituting these expressions in the expression (1), the output Vo close to the actual voltage is calculated.

In the case where the optical distance until of diffused light which reaches the detector via the reflector and the optical distance of the diffused light which reaches the detector via the diffused light absorber are substantially the same, unless the ratio of $\beta$ to $\alpha$ is reduced, a good contrast is not obtained and the noise characteristics deteriorate. In order to increase the signal of the position transducer, it is necessary to increase the forward current of the LED, and therefore, the junction temperature of the LED light source rises and affects the temperature change of the LED light source.

In the case where Sa=Sb as illustrated in FIG. 6B, the numerator term in the expression (1) becomes zero, and therefore, the output of the position transducer is not changed by temperature. However, in the case where Sa≠Sb as illustrated in FIG. 6A and FIG. 6C, the ratio of $\beta$ to $\alpha$ changes due to temperature, and therefore, a drift, which is a change in the output of the position transducer, occurs when the temperature changes. Because of this drift, as illustrated in FIG. 7, the slope of the proportion relationship between the position transducer output Vo and the rotation angle changes. This drift is referred to as a "gain drift". The gain drift of a position transducer with a high accuracy is demanded to be as small as possible. Further, keeping the above-described Ke or $\beta$ small makes it possible to bring the expression (1) close to an ideal expression. In other words, it is possible to reduce the gain drift.

The reflected light attenuates in inverse proportion to the square of the optical distance, and therefore, in the position transducer 100, by appropriately setting the distance from the butterfly-shaped reflector 7 to the diffused light absorber 3 on the fixed side, the conversion factor Ke of the photoelectric current for the illumination from the diffused light absorber 3 is reduced. Due to this, a good contrast ratio is obtained compared to the case where the reflection region and the non-reflection region are provided on the same plane of the reflector, and the signal-to-noise ratio of the position transducer is improved. Further, the influence of the change in the emitted light wavelengths by the temperature of the LED die 4 and the influence of the change in the absorption rate of the diffused light absorber 3 by the temperature rise are reduced, and the stability of the output against temperature is improved.

Further, in the position transducer 100, the reflection region and the non-reflection region are configured by the butterfly-shaped reflector 7 and the diffused light absorber 3 installed on the fixed side with a distance from the reflector. Due to this, even if reflective or non-reflective fine particles have stuck to the reflector, the image illuminated onto the reflector becomes more unlikely to be affected adversely. Further, in the position transducer 100, the reflection region and the non-reflection region are made as different members, and therefore, it is easy to form the reflection region and the non-reflection region as a highly-reflective film and a highly-absorptive film, respectively. Furthermore, the butterfly-shaped reflector 7 has no portion of the non-reflection region, and thus has a low inertia, and this is advantageous to the high-speed responsiveness of the rotation restriction motor 1.

Figure 8A:
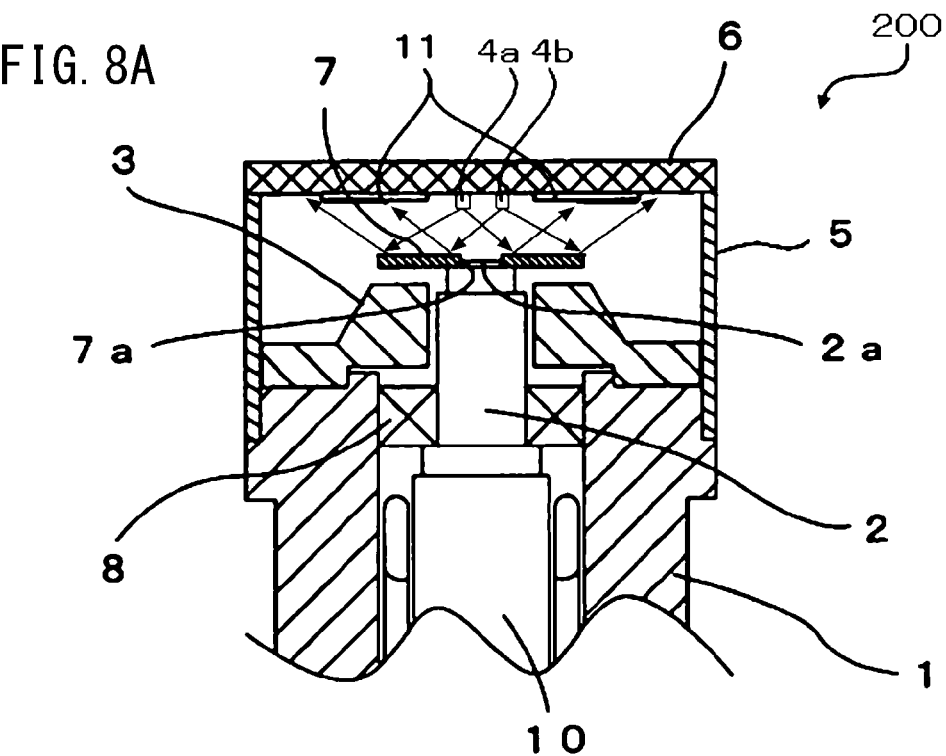
FIG. 8A is a longitudinal section view of a position transducer 200.
Figure 8B:
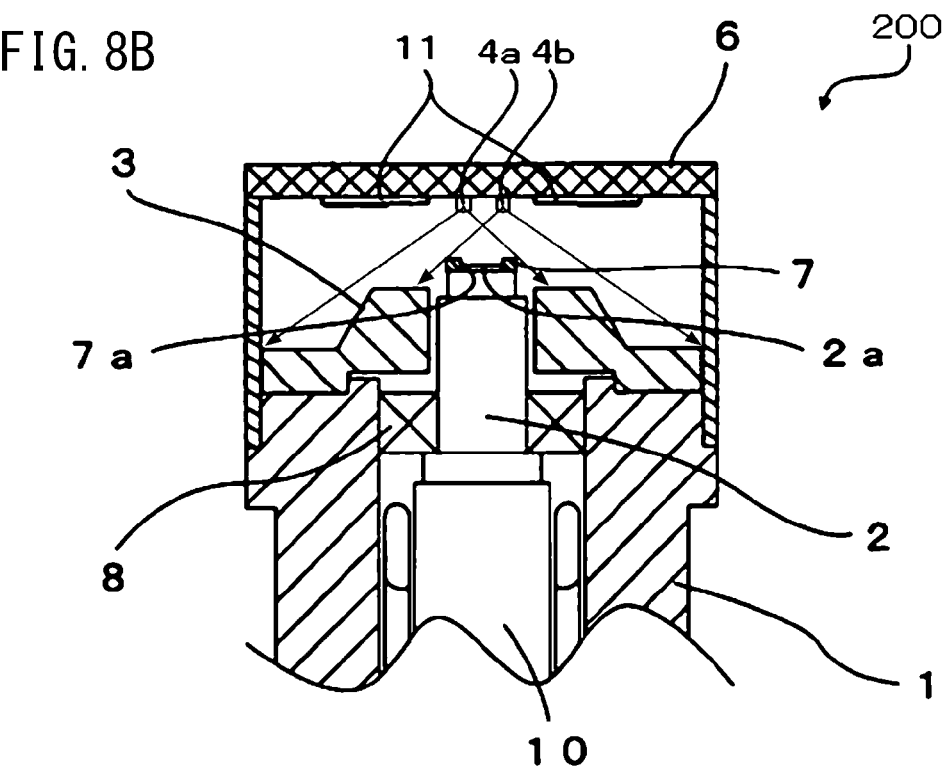
FIG. 8B is a longitudinal section view of the position transducer 200 when the butterfly-shaped reflector 7 in FIG. 8A is rotated by 90 degrees.

FIG. 8A is a longitudinal section view of a position transducer 200. FIG. 8B is a longitudinal section view of the position transducer 200 when the butterfly-shaped reflector 7 in FIG. 8A is rotated by 90 degrees. While the position transducer 100 illustrated in FIG. 1A to FIG. 1D has one LED die as a diffused light source, the position transducer 200 illustrated in FIG. 8A and FIG. 8B has two LED dies as a diffused light source. In other points, the configuration of the position transducer 200 is the same as that of the position transducer 100. In the following, points of the position transducer 200 different from those of the position transducer 100 are explained. Explanation of points in common to those of the position transducer 100 is omitted.

In the position transducer 200, two LED dies 4a and 4b are disposed at the positions corresponding to the center of the rotating shaft 2 on the undersurface of the printed circuit board 6 so as to face the butterfly-shaped reflector 7. The LED dies 4a and 4b are identical diffused light sources, and illuminates light toward the butterfly-shaped reflector 7. In FIG. 8A and FIG. 8B, light illuminated from the LED dies 4a and 4b is indicated by arrows. The LED dies 4a and 4b are also mounted on the printed circuit board 6 by chip on board.

Figure 9:
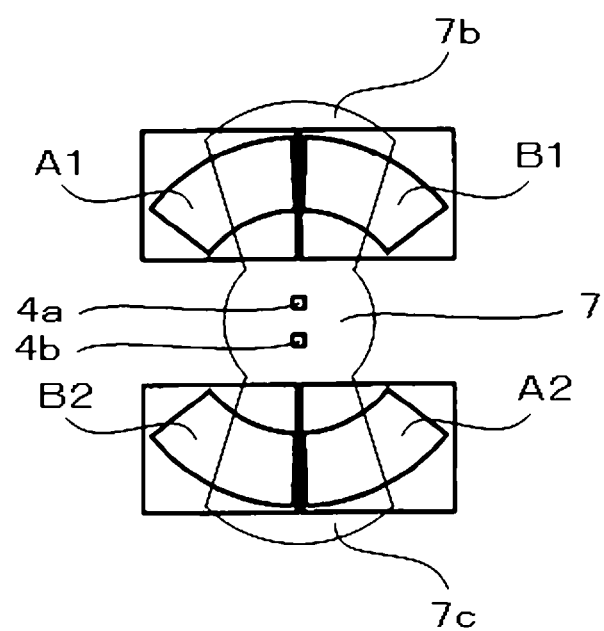
FIG. 9 is a diagram illustrating the positional relationship between the LED dies 4a and 4b and the photodiodes A1, A2, B1, and B2.

FIG. 9 is a diagram illustrating the positional relationship between the LED dies 4a and 4b and the photodiodes A1, A2, B1, and B2. In FIG. 9, for explanation, the butterfly-shaped reflector 7 is also illustrated in the overlapped state. In the position transducer 200, the LED dies 4a and 4b and the photodiodes A1, A2, B1, and B2 are disposed so that the reflection surface 7b on one side of the butterfly-shaped reflector 7, and the LED die 4a and the photodiodes A1 and B1 correspond to each other, and that a reflection surface 7c on the other side, and the LED die 4b and the photodiodes A2 and B2 correspond to each other. In other words, the LED die 4a illuminates the reflection surface 7b and reflected light from the reflection surface 7b is received by the photodiodes A1 and B1. The LED die 4b illuminates the reflection surface 7c, and reflected light from the reflection surface 7c is received by the photodiodes A2 and B2.

The signal processing circuit of the position transducer 200 is the same as the signal processing circuit 13 illustrated in FIG. 5 except in that two LEDs 20 are connected in series.

As described above, by using two LED dies as the diffused light source, the intensities of emitted light are averaged and the variations due to the individual difference between the LEDs are also averaged. Because of this, the output is further stabilized in the position transducer 200 than in the position transducer 100. Further, in the position transducer 200, the same output as that when there is only one LED die can be obtained, even if the forward current of the LED is reduced compared to that in the case of the position transducer 100. As a result, in the position transducer 200, it is possible to reduce the forward current of the LED while maintaining a good contrast ratio. Further, if the forward current of the LED is reduced, the influence of the junction temperature of the LEDs becomes slight and the stability of the output against temperature is further improved. Furthermore, reducing the forward current of the LED leads to advantageous effects in that power is saved and the lifetime of the LEDs is lengthened.

In the following, the results of the experiments are explained in which a position transducer similar to that in FIG. 13A to FIG. 13E, the position transducer 100, and the position transducer 200 are compared.

Table 1 is a table indicating the results of measuring contrast ratios of the output voltages of the position transducers under different conditions. In the measurement, the rotation restriction motor 1 is rotated endlessly, the output voltages of the photodiodes A1, A2, B1, and B2, i.e., the output voltages Va and Vb of the current-voltage conversion units 21a and 21b are observed with an oscilloscope, and P-P (peak-to-peak) voltages and offset voltages are measured. The measurement is performed with the forward current of the LED being fixed to 30 mA.

TABLE 1

| Condition | P-P voltage (V) | | Offset voltage (V) | | Contrast ratio | |
|---|---|---|---|---|---|---|
| | Va | Vb | Va | Vb | Va | Vb |
| (1) | 0.7058 | 0.6735 | 2.079 | 2.031 | 0.34 | 0.33 |
| (2) | 3.532 | 3.534 | 0.1700 | 0.1102 | 20.8 | 32.1 |
| (3) | 6.903 | 6.859 | 0.3547 | 0.3653 | 19.5 | 18.8 |
| (4) | 8.467 | 8.41 | 0.2791 | 0.3082 | 30.3 | 27.3 |

The P-P voltage is a component depending on the received reflected light from the reflector, and corresponds to the maximum amount of change in Kr·Sa·α and Kr·Sb·α, which are the first term of the expression (2) and that of the expression (3), respectively. The offset voltage is a component depending on the received reflected light from a portion other than the reflector, and corresponds to Ke·(S−Sa)·β and Ke·(S−Sb)·β, which are the second term of the expression (2) and that of the expression (3), respectively. The contrast ratio is a ratio of the P-P voltage to the offset voltage.

Conditions (1) to (4) are as follows.

Condition (1): a position transducer similar to FIG. 13A to FIG. 13E is used in which the LED light source is one in number, both the reflection region and the non-reflection region are included in the reflector, and the reflector and the detector are not surrounded by the diffused-light absorbing member.

Conditions (2): the position transducer 100 is used in which the LED light source is one in number, the butterfly-shaped reflector is used, and the reflector and the detector are surrounded by the diffused-light absorbing member.

Condition (3): the position transducer 200 is used in which the LED light sources are two in number, the butterfly-shaped reflector is used, and the reflector and the detector are surrounded by the diffused-light absorbing member.

Condition (4): the position transducer 200 in Condition (3) is used in which a highly reflective metal coating is further applied to the butterfly-shaped reflector.

The highly reflective metal coating is applied to the reflector only in Condition (4).

While the contrast ratio under Condition (1) is about 0.3, the contrast ratio under Condition (2) is not less than 20. By virtue of the butterfly-shaped reflector and the diffused-light absorbing member, compared to the position transducer similar to FIG. 13A to FIG. 13E, the contrast ratio of the position transducer 100 is considerably improved.

Under Condition (3), the P-P voltage and the offset voltage are substantially doubled compared to those under Condition (2), and the contrast ratio is substantially the same as that under Condition (2). As indicated by this, in the position transducer 200, by using two LED light sources, output voltages twice those when using one LED light source are obtained with the same LED forward current. Consequently, in the position transducer 200, it is possible to reduce the LED forward current to about ½ while keeping the contrast ratio about the same as that of the position transducer 100.

The contrast ratio under Condition (4) is about 30 due to the metal coating, and is further improved compared to about 20 under Condition (3). Because of this, in the case where the highly reflective metal coating is applied to the butterfly-shaped reflector, it is possible to further reduce the LED forward current to about ⅔ compared to that in the case where no coating is applied.

Figure 10:
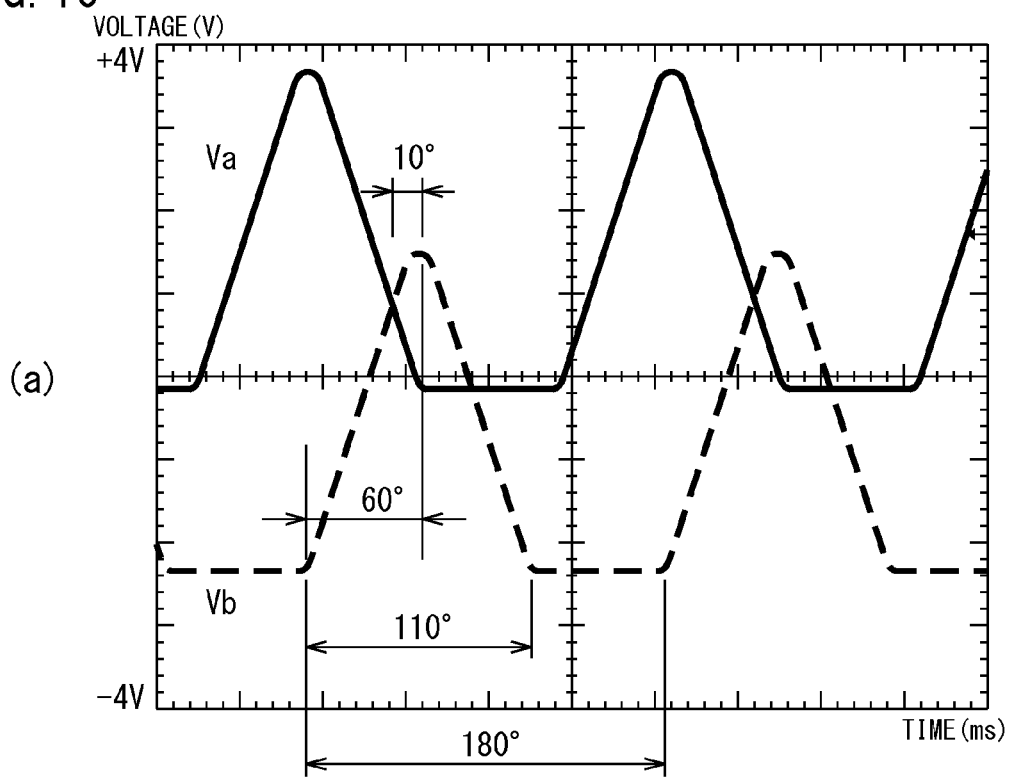
FIG. 10 is a diagram illustrating waveforms of the output voltages of the current-voltage conversion units 21a and 21b.
Figure 10:
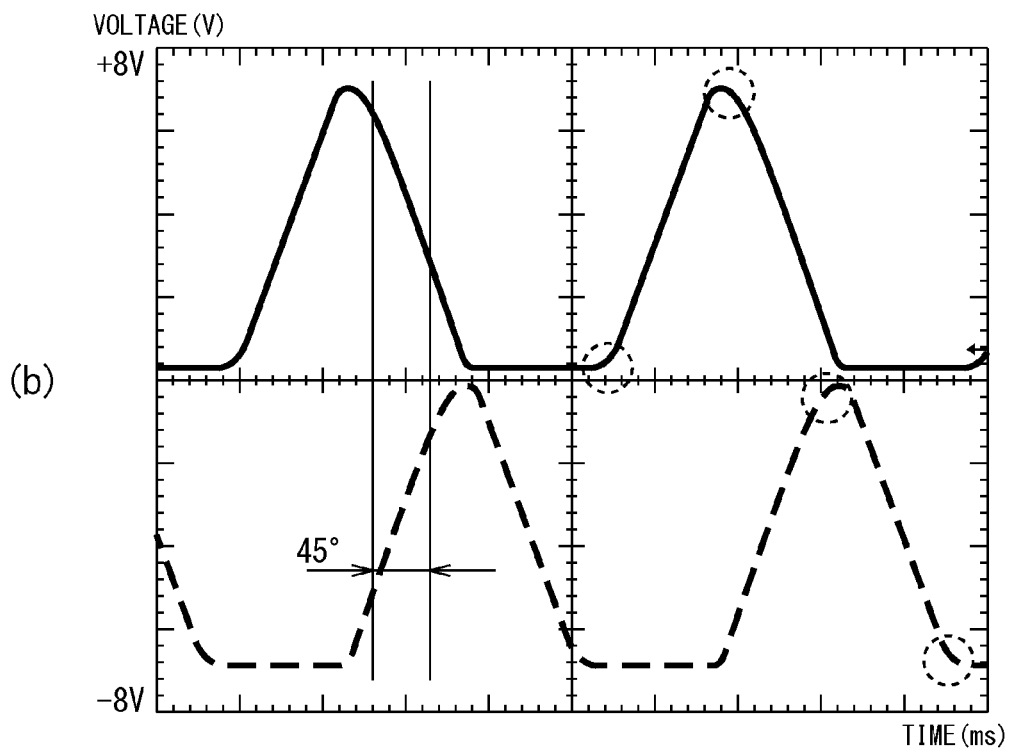

FIG. 10A and FIG. 10B are diagrams illustrating waveforms of the output voltages of the current-voltage conversion units 21a and 21b. In each diagram, the vertical axis represents the voltage (V), and the horizontal axis represents the time (ms). FIG. 10A and FIG. 10B illustrate the output voltages Va and Vb of the current-voltage conversion units 21a and 21b under Conditions (2) and (3) described above, respectively. Since the voltage value changes in accordance with the rotation angle of the rotation restriction motor 1, FIG. 10A also illustrates the correspondence between the rotation angle and the voltage value. In the waveforms of the output voltages under Condition (3), distortions are observed in the portions surrounded by broken line circles in FIG. 10B. However, what is actually necessary as the output of the position transducer is only the voltage in the range corresponding to the rotation angle (mechanical angle) of about 45 degrees illustrated in FIG. 10B, and the distortions in the waveforms occur outside the range. As a result, the distortions in the waveforms in FIG. 10B do not raise any practical problem.

Although not illustrated schematically, in the case of Condition (4), as in FIG. 10B, distortions are also observed in the waveforms. However, in the case of Condition (4), the distortions in the waveforms also occur outside the range of the rotation angle (mechanical angle) of about 45 degrees, the voltage in which is actually necessary. As a result, the distortions in the waveforms under Condition (4) do not raise any practical problem.

Table 2 is a table indicating the results of measuring the LED forward current (current If in FIG. 5) under Conditions (2) to (4) described above. The table indicates the results of comparison and measurement on condition that the circuit constant in FIG. 5 is the same value, and indicates values obtained by averaging measured values of samples of 13 to 18 devices.

TABLE 2

| Condition | LED forward current (mA) |
|---|---|
| (2) | 25.8 |
| (3) | 12.2 |
| (4) | 6.9 |

Under Condition (3) in which the LED light sources are two in number, the LED forward current is reduced to about ½ compared to Condition (2) in which the LED light source is one in number. Under Condition (4) in which the metal coating is applied to the reflector, the LED forward current is further reduced to about ⅔ compared to that under Condition (3).

Table 3 is a table indicating the results of measuring the change in the output (gain drift) of the position transducers depending on temperature under Conditions (1) to (3) described above. In addition to the results under Conditions (1) to (3), the result under Condition (1)': a position transducer is used in which the LED light source is one in number, the butterfly-shaped reflector is used, and the reflector and the detector are not surrounded by the diffused-light absorbing member is also indicated.

TABLE 3

| Condition | Gain drift |
|---|---|
| (1) | 200 to 500 ppm/° C. |
| (1)' | 100 to 200 ppm/° C. |
| (2) | 50 ppm/° C. or less |
| (3) | 40 ppm/° C. or less |

In the case of Condition (2) in which the position transducer 100 is used, due to the effect of the butterfly-shaped reflector and the diffused-light absorbing member, the gain drift is improved to ½ or less compared to the cases of Conditions (1) and (1)'. In the case of Condition (3) in which the position transducer 200 is used, by providing two LED light sources, the gain drift is further improved by about 10 ppm/° C. From this, it can be seen that in the position transducers 100 and 200, the stability of the output against temperature is further improved. In the case of Condition (4) described above, it is considered that the gain drift will be further improved from 40 ppm/° C. by applying a metal coating to the butterfly-shaped reflector.

Figure 11:
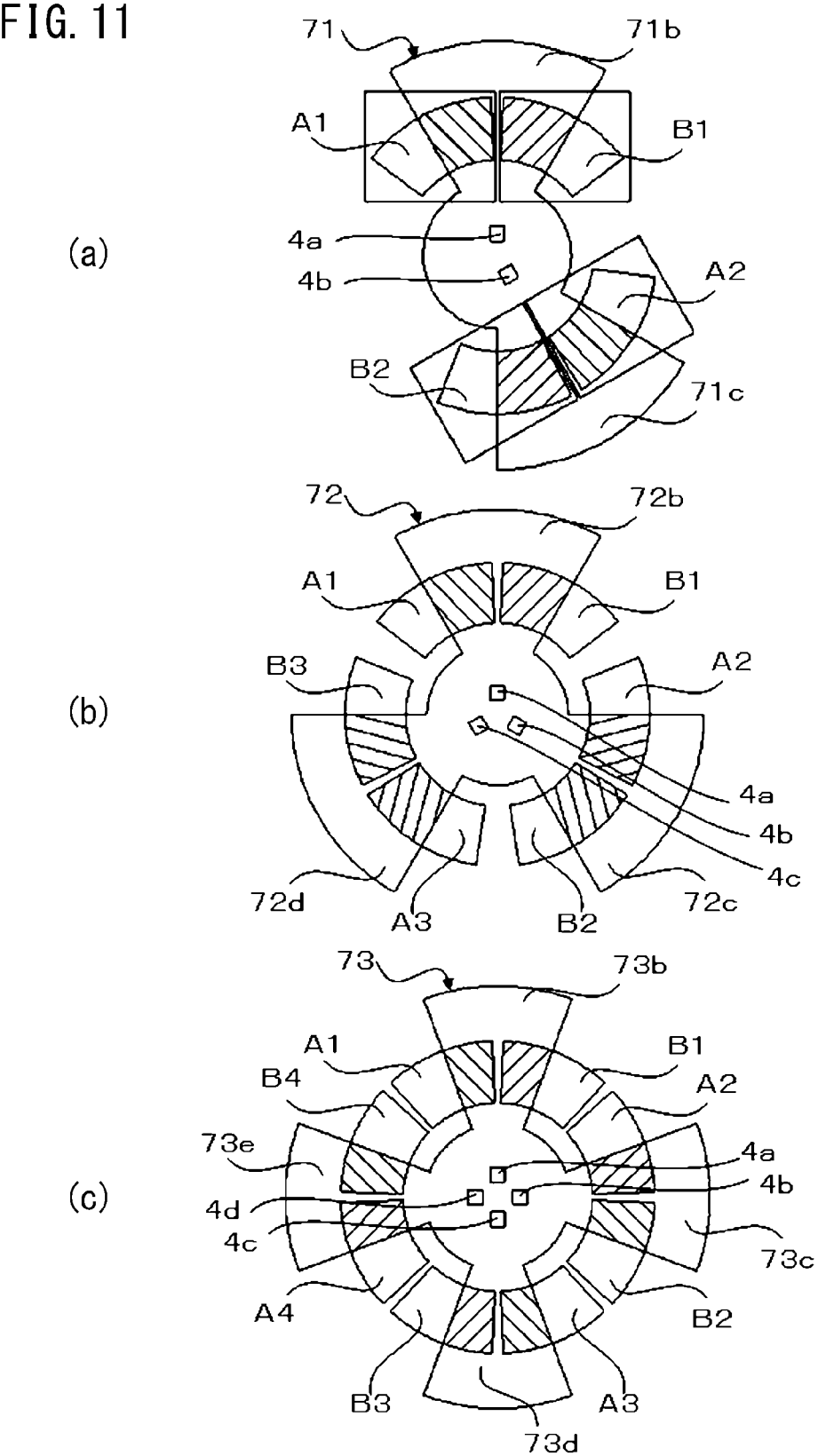
FIG. 11 is a diagram for explaining modified examples of the reflector.

FIG. 11A to FIG. 11C are diagrams for explaining modified examples of the reflector. As illustrated schematically, the disposition angle of the reflection surfaces of the reflector may be different from that in FIG. 3, and the number of reflection surfaces may not be two.

FIG. 11A is a diagram illustrating a butterfly-shaped reflector 71 in which two reflection surfaces 71b and 71c are not aligned on one straight line. As in FIG. 11A, the two reflection surfaces 71b and 71c may not be oriented so as to form an angle of 180 degrees. In the case where the butterfly-shaped reflector 71 is used, it is recommended that the LED dies 4a and 4b and the photodiodes A1, A2, B1, and B2 be disposed in accordance with the angle formed by the two reflection surfaces 71b and 71c. In other words, it is recommended that the LED die 4a and the photodiodes A1 and B1 on one side be disposed in accordance with the reflection surface 71b on the one side, and that the LED die 4b and the photodiodes A2 and B2 on the other side be disposed in accordance with the angle of the reflection surface 71c on the other side with respect to the reflection surface 71b.

FIG. 11B is a diagram illustrating a clover-shaped reflector 72 having three reflection surfaces 72b, 72c, and 72d protruding radially from the center through which the rotating shaft passes. In the case where the clover-shaped reflector 72 is used, it is recommended that the LED die 4a and the photodiodes A1 and B1, the LED die 4b and the photodiodes A2 and B2, and an LED die 4c and photodiodes A3 and B3 be disposed in accordance with angles formed by the three reflection surfaces 72b, 72c, and 72d, respectively.

FIG. 11C is a diagram illustrating a clover-shaped reflector 73 having four reflection surfaces 73b, 73c, 73d, and 73e protruding radially from the center through which the rotating shaft passes. Also in the case where the clover-shaped reflector 73 is used, it is recommended that the LED die 4a and the photodiodes A1 and B1, the LED die 4b and the photodiodes A2 and B2, the LED die 4c and the photodiodes A3 and B3, and an LED die 4d and photodiodes A4 and B4 be disposed in accordance with angles formed by the four reflection surfaces 73b, 73c, 73d, and 73e, respectively.

In the case where the reflector in any one of FIG. 11A to FIG. 11C is also used, the LED light source may be one in number.

Figure 12:
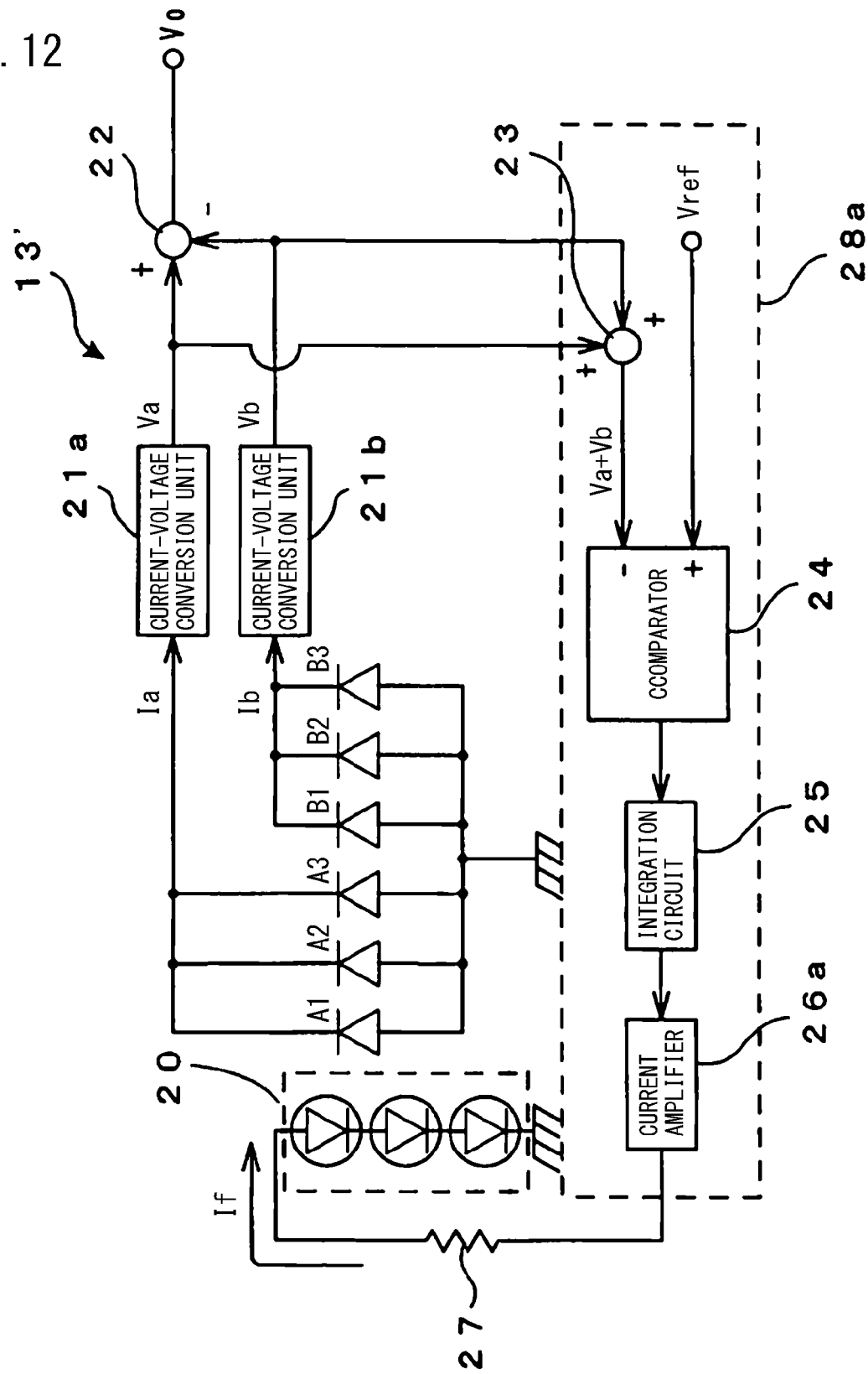
FIG. 12 is a circuit diagram of a signal processing circuit 13' of a position transducer that uses the clover-shaped reflector 72 in FIG. 11B.

FIG. 12 is a circuit diagram of a signal processing circuit 13' of a position transducer that uses the clover-shaped reflector 72 in FIG. 11B. As illustrated in FIG. 12, even if the number of LEDs and photodiodes increases, the signal processing circuit of the position transducer may be similar to the signal processing circuit 13 illustrated in FIG. 5. Specifically, the photodiodes A1, A2, and A3 and the photodiodes B1, B2, and B3 are connected in parallel, respectively, and three LEDs 20 are connected in series. This remains the same even if the number of LEDs and photodiodes changes. The rest of the signal processing circuit 13' is the same as that of the signal processing circuit 13 in FIG. 5.

It may also be possible to use a rectangular LED chip, for example, as two light sources by covering the central part of the LED chip with a light shielding part, in place of providing a plurality of LED dies.

Further, as the diffused light source, it may also be possible to use an LED having a large chip area. It may also be possible to use light in the visible light region by changing the material of the optical element. Further, it may also be possible to provide a hemispherical lens by using a highly thixotropic transparent resin or glass, in order to efficiently direct diffused light of the LED die toward the butterfly-shaped reflector.

Preferably, the LED die is mounted directly on the printed circuit board so that the photodiodes are not illuminated directly with diffused light of the LED die. However, the LED die and the photodiodes may not be disposed on the same plane.

As the reflector, it may also be possible to use a resin fabricated into, for example, the shape of a butterfly, by using a mold, etc., and which is provided with a reflection surface by plating, etc. Further, it may also be possible to press fit and fix a reflector provided with a hole in its central part to the rotating shaft of the rotation restriction motor, not only by fitting. By attaching the reflector to the rotating shaft by fitting, the alignment work with the rotating shaft is no longer necessary, and thus the manufacturing cost is reduced.

As the diffused-light absorbing member, it may also be possible to make use of an aluminum material having been subjected to black matting. Further, it may also be possible to make use of a non-reflective coating agent, such as black nickel plating, a black resin, etc. In the case where light in the visible light region is used, as the diffused-light absorbing member, it may also be possible to make use of an anodic oxide coating (black-matted alumite).

The longer the distance from the reflection surfaces of the butterfly-shaped reflector to the diffused light absorber, the greater the improvement effect. However, from the practical viewpoint, preferably, the distance is set to about 0.2 mm to 5 mm. If the member on the fixed side of the rotation restriction motor is located at a distance where light that reaches the detector from a portion other than the reflector is sufficiently attenuated, it is not necessary to dispose the diffused-light absorbing member in the member on the fixed side. In the case where the inner surface of the casing is sufficiently distant from the detector, it is not necessary to cover the inner surface of the casing with the diffused-light absorbing member.

Preferably, a shielding part in the shape of a fan is provided by aluminum vapor deposition, etc., on the surface of the photodiode, so that light is prevented from reaching unnecessary portions of the detector. Further, preferably, as four photodiodes, those extracted from the positions close to one another in one wafer are used in order to reduce variations in the characteristics. Furthermore, preferably, the spectral sensitivity wavelength of the photodiode is the same as the peak wavelength of the LED described above.

For the purpose of improving the mount accuracy of four photodiodes, it may also be possible to fabricate a photodiode array in which, for example, A1 and B1 make a pair. Further, it may also be possible to use a p-layer substrate as the photodiode array in order to share the signal processing circuit in the subsequent stage. Furthermore, it may also be possible to use a photodiode array in which A1 and B1, and A2 and B2 make two pairs fabricated by the process for digging the region in which the LED die is mounted. It may also be possible to use a photodiode array formed into a monolithic form and to dispose an LED corresponding thereto.

INDUSTRIAL APPLICABILITY

This invention is a position transducer to be mounted on a rotation restriction motor configured to drive optical parts, such as a mirror, for scanning laser light.

REFERENCE SIGNS LIST 1 rotation restriction motor
2 rotating shaft
3 diffused light absorber
3d diffused-light absorbing member
4 LED die
5 case
6 printed circuit board
7 butterfly-shaped reflector
8 bearing
9 connector
10 rotor
11 detector
13, 13' signal processing circuit
20 LED
21a, 21b current-voltage conversion unit
22 subtractor
23 adder
24 comparator
25 integration circuit
26a current amplifier
27 resistor
28a AGC circuit
100, 200 position transducer

What is claimed is:

1. A position transducer comprising:
a reflector attached to a rotating shaft of a rotation restriction motor, the reflector having a plurality of reflection surfaces protruding radially from the rotating shaft;
diffused light sources disposed so as to face a central portion of the reflection surfaces of the reflector, the number of diffused light sources being the same as that of the reflection surfaces;
a diffused-light absorbing member installed on a fixed side of the rotation restriction motor so as to surround the reflector with a distance from the reflector at the rear of the reflector as viewed from the diffused light sources the diffused-light absorbing member absorbing illumination light from the diffused light sources which has not illuminated the reflection surfaces; and
a plurality of detectors mounted on the same printed circuit board as the diffused light sources to detect an image reflected by the reflector,
wherein the diffused light sources and the plurality of detectors are disposed in accordance with an angle formed by the plurality of reflection surfaces.

2. The position transducer according to claim 1, wherein the diffused-light absorbing member has a fine structure provided by surface treatment and absorbs the illumination light by repeatedly reflecting the illumination light within the fine structure.

3. The position transducer according to claim 2, wherein as the reflection surfaces, the reflector has a plurality of reflection surfaces protruding radially from the rotating shaft on the same plane.

4. The position transducer according to claim 3, wherein the diffused light sources are LEDs in the same number as that of the reflection surfaces.

5. The position transducer according to claim 3, wherein the reflector has reflection surfaces, in the shape of a butterfly as the reflection surfaces.

6. The position transducer according to claim 3, wherein the plurality of detectors is two sets of photodiodes, each set including photodiodes in the number corresponding to that of the reflection surfaces, and the two sets of photodiodes are disposed side by side so as to alternately surround the rotating shaft.

7. The position transducer according to claim 1, wherein a metal coating is applied to the reflection surfaces of the reflector.

8. The position transducer according to claim 1, wherein the plurality of detectors each outputs a signal that continuously increases or decreases in accordance with a continuous increase or decrease in a light receiving region in each detector when the position of an image by the reflector moves due to rotation, and the position transducer further comprises a signal processing circuit connected to each of the plurality of detectors, the signal processing circuit outputting a voltage value corresponding to an increase or decrease in the light receiving region.

\* \* \* \* \*